United States Patent
Hayashida et al.

(10) Patent No.: US 7,020,979 B2
(45) Date of Patent: Apr. 4, 2006

(54) DIGITAL DISPLACEMENT MEASURING INSTRUMENT

(75) Inventors: Shuuji Hayashida, Kawasaki (JP); Yuji Fujikawa, Kawasaki (JP); Yuichi Ichikawa, Kawasaki (JP); Osamu Saito, Kawasaki (JP); Takahiro Nakamura, Higashihiroshima (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 10/859,966

(22) Filed: Jun. 4, 2004

(65) Prior Publication Data

US 2004/0250439 A1 Dec. 16, 2004

(30) Foreign Application Priority Data

Jun. 10, 2003 (JP) .............................. 2003-165194

(51) Int. Cl.
*G01B 3/18* (2006.01)

(52) U.S. Cl. .......................................... 33/813; 33/819
(58) Field of Classification Search .................... None
See application file for complete search history.

(56) References Cited

U.S. PATENT DOCUMENTS

| 3,686,766 | A | * | 8/1972 | Matumoto ................... 33/819 |
| 4,255,861 | A | * | 3/1981 | Nakata et al. ................ 33/819 |
| 4,578,868 | A | * | 4/1986 | Sasaki et al. ................. 33/819 |
| 5,495,677 | A | * | 3/1996 | Tachikake et al. ............ 33/815 |
| 5,829,155 | A | * | 11/1998 | Takahashi et al. ............ 33/813 |
| 6,915,591 | B1 | * | 7/2005 | Hayashida et al. ........... 33/815 |

FOREIGN PATENT DOCUMENTS

| JP | 07159102 A | * | 6/1995 |
| JP | B2 2786801 | | 5/1998 |

* cited by examiner

*Primary Examiner*—Christopher W. Fulton
(74) *Attorney, Agent, or Firm*—Oliff & Berridge, PLC

(57) ABSTRACT

A stator (42) is hooked in a frame body (10) away with a prespecified space from a spindle (2), so that it is not necessary to fix the stator with a screw. The stator (42), therefore, can easily be mounted, and further as it is not necessary to provide a screw hole in the frame body (10), so that the need for waterproofing processing associated with a screw hole is eliminated. Further the stator (42) is hooked in a protrusion (53) of an electronic unit (50) inside the frame body (10) away with a prespecified space from the spindle (2), so that a rotation thereof in the peripheral direction of the spindle due to play and rattle is small and a measurement error can be suppressed.

4 Claims, 8 Drawing Sheets

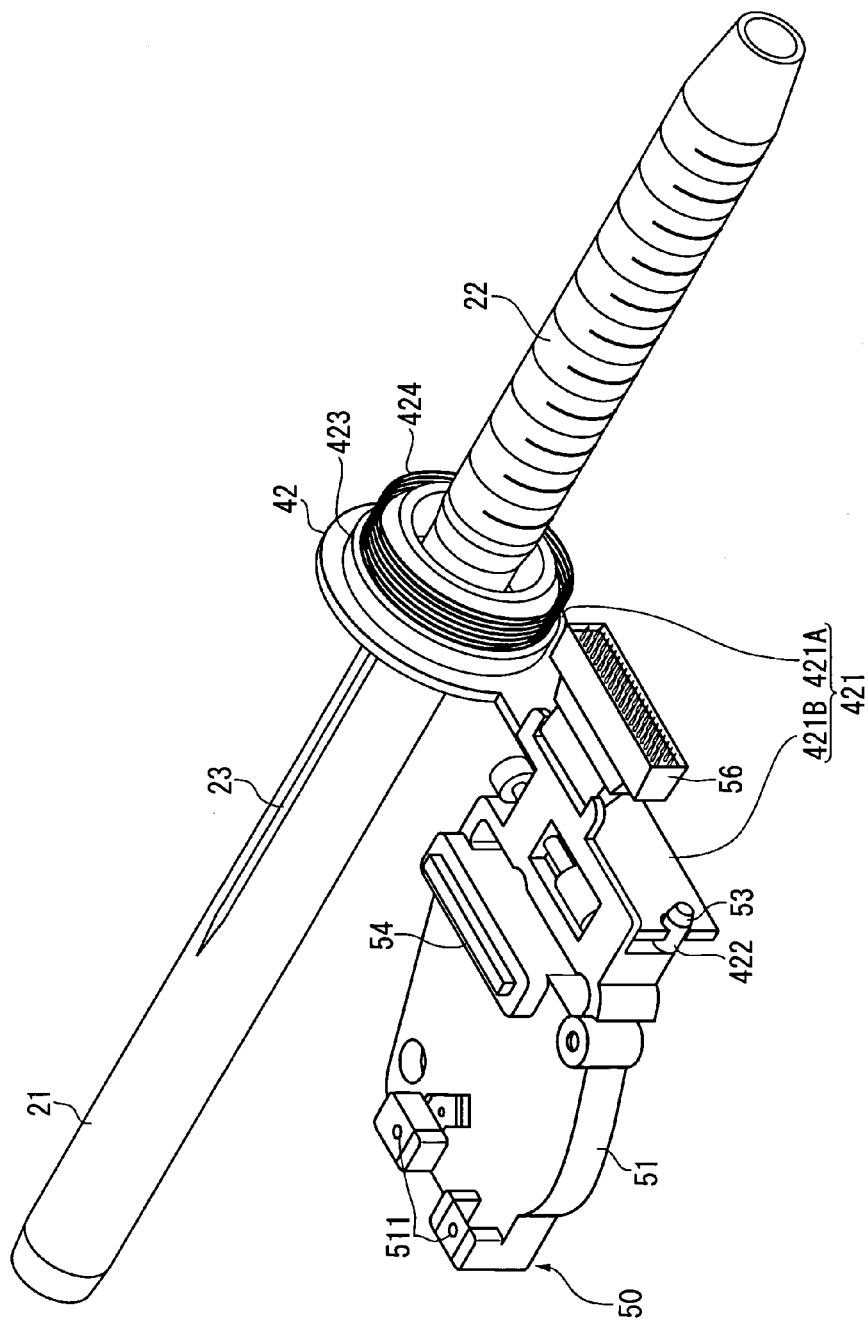

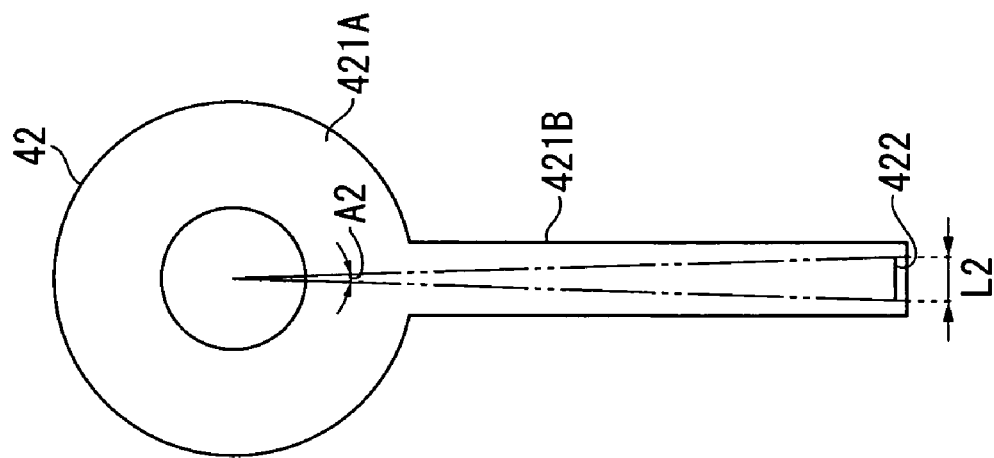
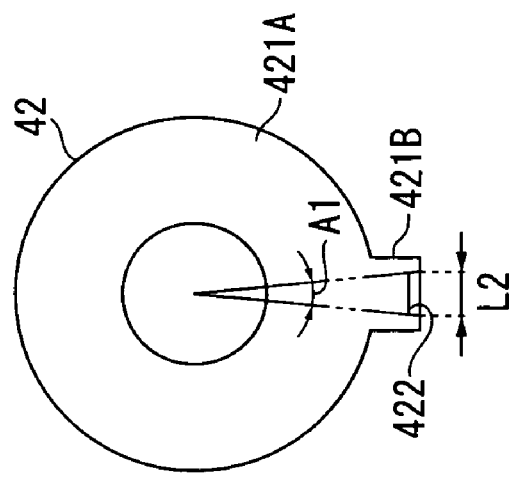

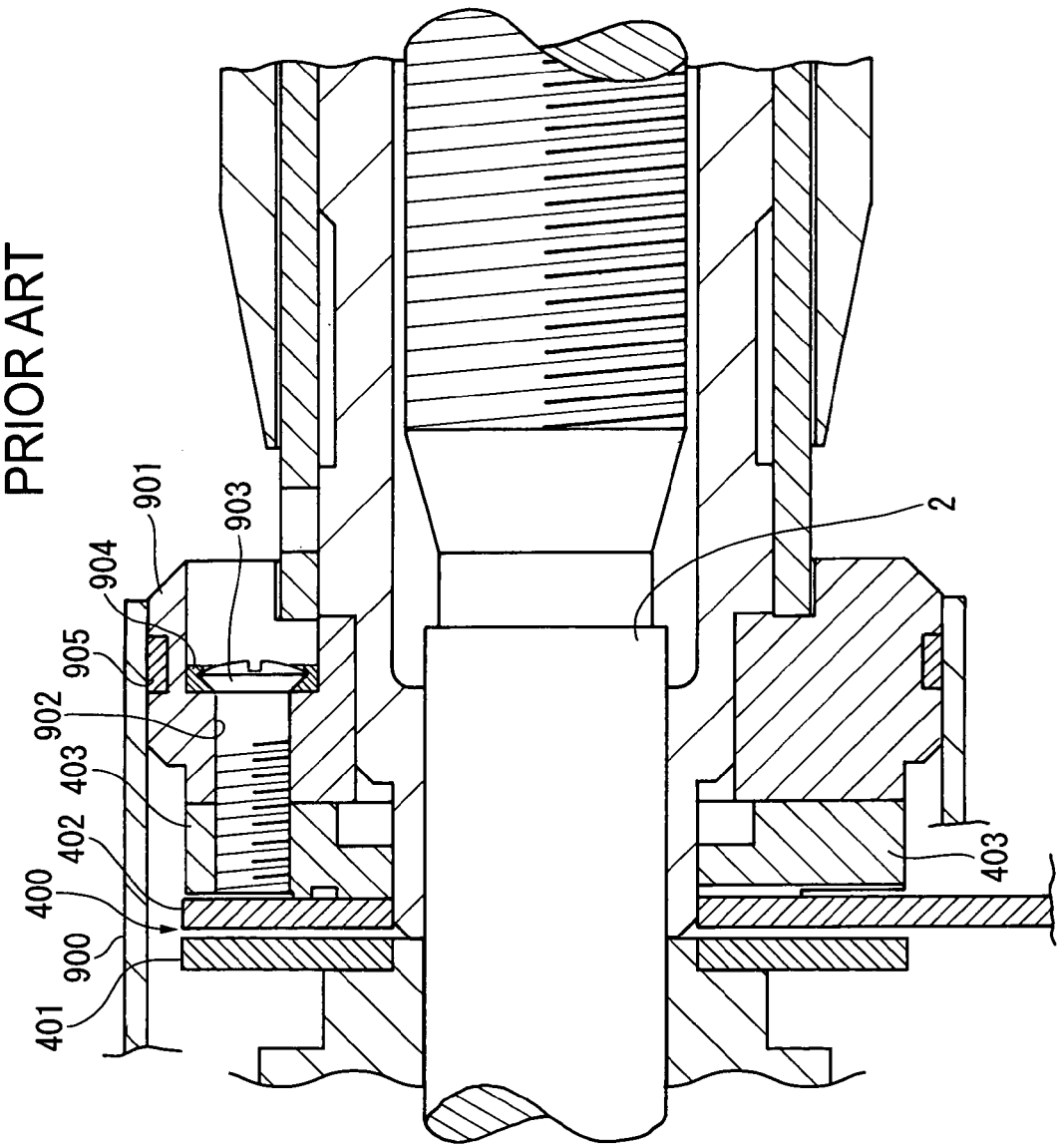

DIGITAL DISPLACEMENT MEASURING INSTRUMENT

BACKGROUND OF THE INVENTION

1. Field of the Invention

The present invention relates to a structure of a digital displacement measuring instrument for measuring displacement of a spindle in an axial direction.

2. Description of Related Art

Conventionally there have been used displacement measuring instruments for measuring dimensions of an object for measurement according to a sliding rate of a spindle. Among the displacement measuring instruments, especially a digital displacement measuring instrument is easy to handle, and can measure dimensions more accurately. When the digital displacement measuring instrument is used in an environment in which water droplets or droplets of other liquids such as grinding oil are frequently sputtering, if the droplets come into inside of the displacement measuring instrument, an encoder may produce improper operating signals to generate an error or a failure. To solve this problem, there has been developed a digital displacement measuring instrument having resistance against water and oil (Refer to, for instance, JP2786801B, FIG. 3).

FIG. 8 shows a micrometer 100B based on the conventional technology. This micrometer 100B has a digital encoder 400 for detecting a sliding rate of a spindle 2. Provided in this encoder 400 are a rotor 401 rotating in association away with rotation of the spindle 2 transmitted thereto, and a stator 402 fixed to a frame body 900 with a prespecified space from the rotor 401. A stator fixing section 403 is fixed to this stator 402, and this stator fixing section 403 is fixed to a holding ring 901 by screwing a screw 903 penetrating a stator mount hole 902 provided on the holding ring 901.

As a waterproofing mechanism for this micrometer 100B, there are a seal member 904 provided between the stator mount hole 902 and the screw 903, and a seal member 905 provided between the holding ring 901 and the frame body 900.

With the micrometer described in the document above, however, it is necessary to provide a stator mount hole 902 for screwing the screw therein on the holding ring 901 to fix the stator 402 more tightly by means of screwing from the outside. It is not desirable to provide a hole on the holding ring 901 exposing to the outside from the view point of a waterproofing structure, and in addition the actions for water proofing processing in the screwing section are very complicated.

SUMMARY OF THE INVENTION

An object of the present invention is to provide a digital displacement measuring instrument having sufficient water resistance with improved adaptability to being assembled.

A digital displacement measuring instrument according to an aspect of the present invention includes: a main body; a spindle slidably provided at the main body; and an encoder accommodated in the main body for detecting displacement of the spindle to convert a value for the detected displacement to an electric signal, in which the encoder has a rotor rotating in a peripheral direction of the spindle and a stator provided inside the main body at a position opposite to the rotor with a prespecified space therefrom, and in which the stator is directly or indirectly via other component hooked in the main body at a position away with a prespecified space from the spindle.

With this arrangement, the stator is directly hooked in the main body or also indirectly hooked in other members, so that it is not necessary to fix the stator by means of screwing like in the conventional technology. Because of this feature, the stator can easily be attached, and it is not necessary to provide a screw hole on the main body, so that the waterproofing processing associated with a screw hole is not necessary.

Further the stator is hooked in the main body at a position away from the spindle with a prespecified space, and because of this feature, a rotation of the stator along the periphery of the spindle can be kept smaller as compared to a case in which the stator is hooked at a position near the spindle, so that the measurement error can be suppressed. Namely comparing a case where a stator is hooked at a position near a spindle to a case where a stator is hooked in the main body at a position away from a spindle with a prespecified space, and assuming that play and rattle with the same size occurs at a position where the stator is fixed, the stator may be substantially displaced in the peripheral direction due to the play and rattle in the case where the stator is hooked at a position near the spindle, but a rotation of the stator generated by the play and rattle can be suppressed to a small value in the case where the stator is hooked in the main body at a position away from the spindle with a prespecified space.

Preferably, the above digital displacement measuring instrument, further includes: a support member provided at an edge of the main body for supporting the spindle in the longitudinal direction thereof; an adjustment member provided on the support member for positioning the rotor; and an elastic member for biasing the stator toward the rotor.

With this arrangement, the rotor is positioned by the adjustment member, and the stator is positioned by being biased by an elastic member to the rotor side and contacted to a portion of the rotor. When a strong impact is loaded to the stator, for instance, when the stator is dropped, the screw is loosened due to the impact in a case when the stator is fixed by screwing like in the conventional technology, and sometimes play and rattle may occur to generate an error. In this arrangement, however, as the stator is biased toward the rotor by the elastic member, so that play and rattle does not occur even when an impact is loaded to the stator. Therefore, a space (sensor gap) is kept at a constant value between the stator and the rotor, and even when an impact is loaded thereto, the sensor gap does not change, so that an error or a measurement error is not generated during measurement.

Preferably, in the above digital displacement measuring instrument, an electronic unit for supplying power to the encoder and enabling delivery of electric signals from the encoder is provided within the main body, and the electronic unit has a protrusion with the stator hooked in this protrusion.

With this arrangement, as the stator is hooked in the protrusion of the electronic unit, the stator is hooked at a position away from the spindle, influence by play and rattle can be suppressed, and in addition the stator and the electronic unit are placed to be contacted to each other, so that the stator and the electronic unit can easily be connected to each other electrically.

Preferably, in the above digital displacement measuring instrument, a display module for displaying the electric signal converted by the encoder and sent to the electronic unit as a measurement value is provided at the main body, and the display module covers and also contacts the electronic unit to be connected thereto electrically.

With this arrangement, the electronic unit and the display module are contacted and electrically connected to each other, so that wiring is not required and a number of components can be reduced. Further as wiring is not required for connection between the display module and the electronic unit, the display module can be removed as a single body from the main body, and therefore the display module does not disturb maintenance of the electronic unit, which insures the improved adaptability to maintenance.

Preferably, in the above digital displacement measuring instrument, the electronic unit is formed by unitizing a battery case for accommodating a battery therein, a battery terminal, an interconnector for enabling electric conduction by contacting the display module, and a stator wiring member for electrically connecting the stator to the electronic unit.

With this arrangement, the electronic unit includes the battery case, the battery terminal, the interconnector, and the stator wiring member, all of which are formed into a unit, and therefore it is not necessary to incorporate each component discretely in the main body, and it is required only to incorporate the unitized electronic unit in the main body, so that the adaptability to being assembled is improved. Further by incorporating a substrate enabling electric conductivity within the unit, a work for wiring among the components is not necessary, so that a number of required components and parts can be reduced.

BRIEF DESCRIPTION OF THE DRAWINGS

FIG. 4 is a perspective view showing a stator and an electronic unit according to the embodiment;

FIG. 7A and FIG. 7B are front elevational views each showing the stator; and

FIG. 8 is a cross-sectional view showing an encoder based on the conventional technology.

DETAILED DESCRIPTION OF PREFERRED EMBODIMENT(S)

An embodiment of the present invention is described with reference to the related drawings.

Figure 1:
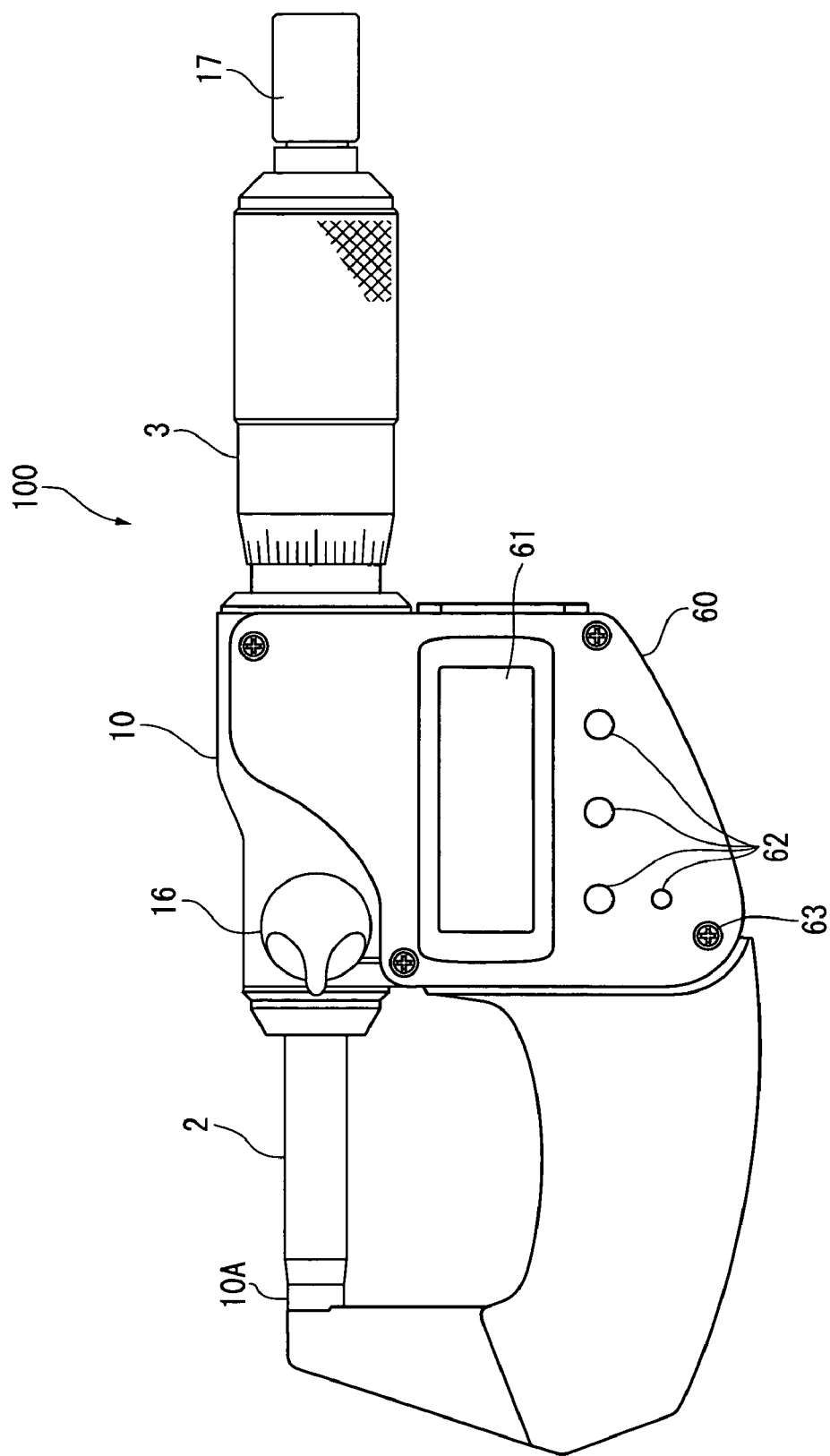
FIG. 1 is a front elevational view entirely showing a digital displacement measuring instrument according to one embodiment of the present invention.
Figure 2:
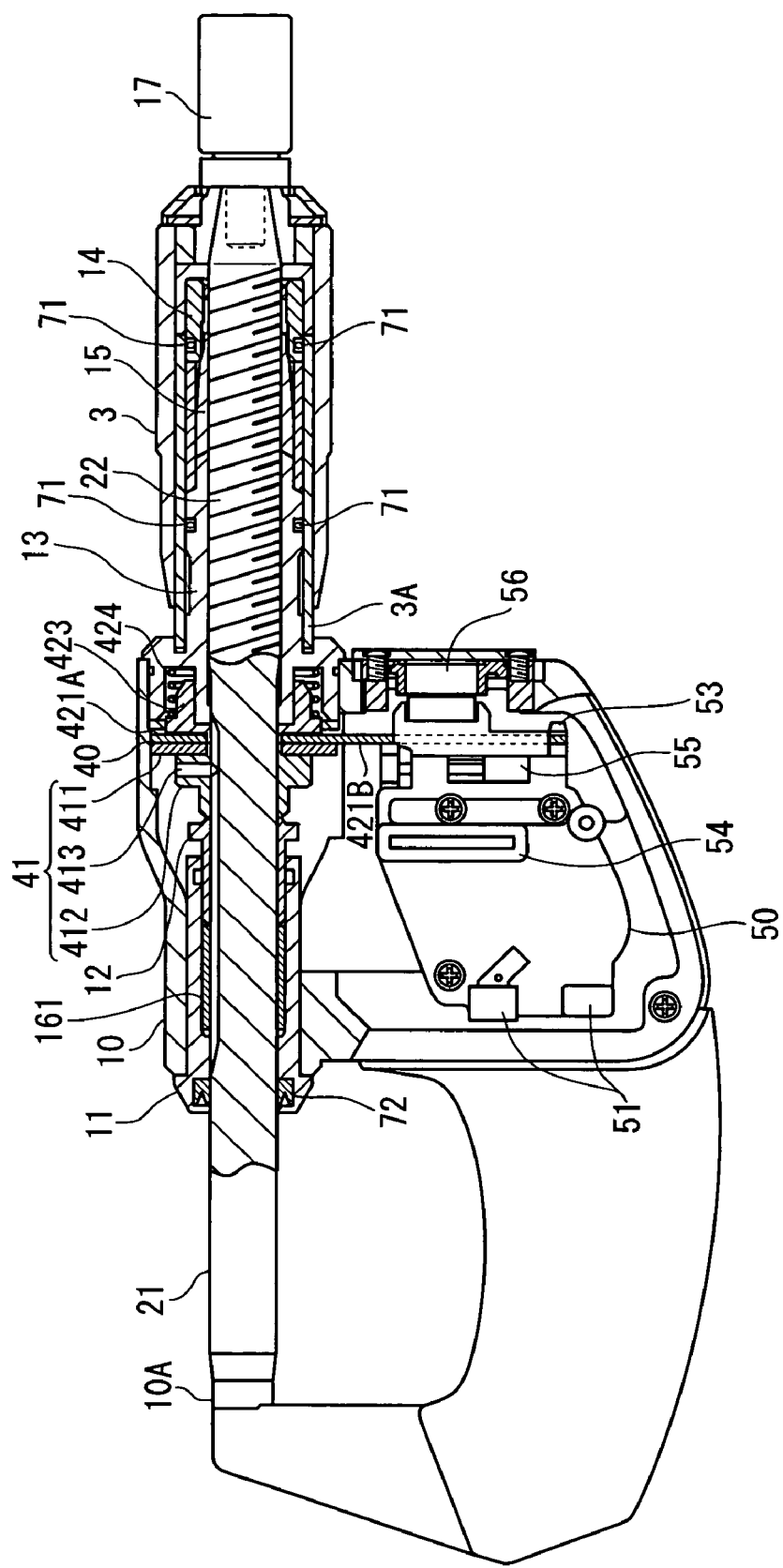
FIG. 2 is a cross-sectional view showing a main body of the digital displacement measuring instrument according to the embodiment.

FIG. 1 to FIG. 7B show the embodiment of the present invention. FIG. 1 is a front elevational view entirely showing a digital micrometer 100 according to the embodiment. FIG. 2 is a plan cross-sectional view showing inside of the micrometer 100. In FIG. 1 and FIG. 2, the micrometer 100 includes an approximately U-shaped frame body 10, a spindle 2 slidably provided on this frame body 10, an encoder 40 for detecting displacement of the spindle 2 inside the frame body 10, an electronic unit 50 electrically connectable to the encoder 40, and a display module 60 for displaying values measured by the encoder 40.

The frame body 10 is made from a light and rigid metal. Fixed to one edge of this frame body 10 is an anvil 10A, and a bearing tube 11 as a supporting member for slidably supporting the spindle 2 is provided on another edge thereof. The bearing tube 11 has a substantially cylindrical form, and the spindle 2 is inserted into and supported by an internal peripheral surface of the bearing tube 11. Provided on the internal peripheral surface of the bearing tube 11 is a clamp collar 161 along the longitudinal direction. When a clamp screw 16 provided outside the frame body 10 is clamped, the clamp collar 161 clamps the spindle 2 to restrict sliding of the spindle 2. Further an inner sleeve 13 having a substantially cylindrical form is provided in the frame body 10, and the spindle 2 can be moved toward and away from the anvil 10A by rotating a thimble 3 provided on an external peripheral surface of the inner sleeve 13.

The spindle 2 has a spindle body 21 and a screw shaft 22 provided on a straight line. This spindle 2 may contain one cylindrical member, or may contain other member(s). The inner sleeve 13 provided along the longitudinal direction of the spindle 2 has one edge section supported by the frame body 10, and the other edge section has a female screw engraved inward to the internal peripheral surface with the screw shaft 22 of the spindle 2 screwed therein. Further a male screw is provided on the external peripheral surface of the inner sleeve 13 at the other edge section, and a taper nut 14 is engaged thereon. Three notches are provided at prespecified positions, in a section where the male screw of the inner sleeve 13 is provided, to form a three-way notch section 15. The taper nut 14 is a member used for adjusting engagement between the spindle 2 and the inner sleeve 13. Namely when the taper nut 14 is rotated to move in the axial direction of the inner sleeve 13, the tightening state of the three-way notch section 15 changes with the inner diameter of the inner sleeve 13 also changed, and by changing the inner diameter of the inner sleeve 13 as described above, engagement between the spindle 2 and the inner sleeve 13 can be adjusted.

A ratchet 17 is provided to hold an object for measurement at a constant pressure at the edge of the spindle 2 for the purpose to prevent the object for measurement from being broken due to the overpressure when the spindle 2 is moved to hold the object for measurement with the anvil 10A.

The electrostatic capacitance encoder 40 is used as an encoder in the present embodiment. This encoder 40 is provided around the spindle 2, and includes a rotor 41 rotating in association with screwing rotation of the spindle 2, and a stator 42 provided at a position opposite to the rotor 41.

Figure 3:
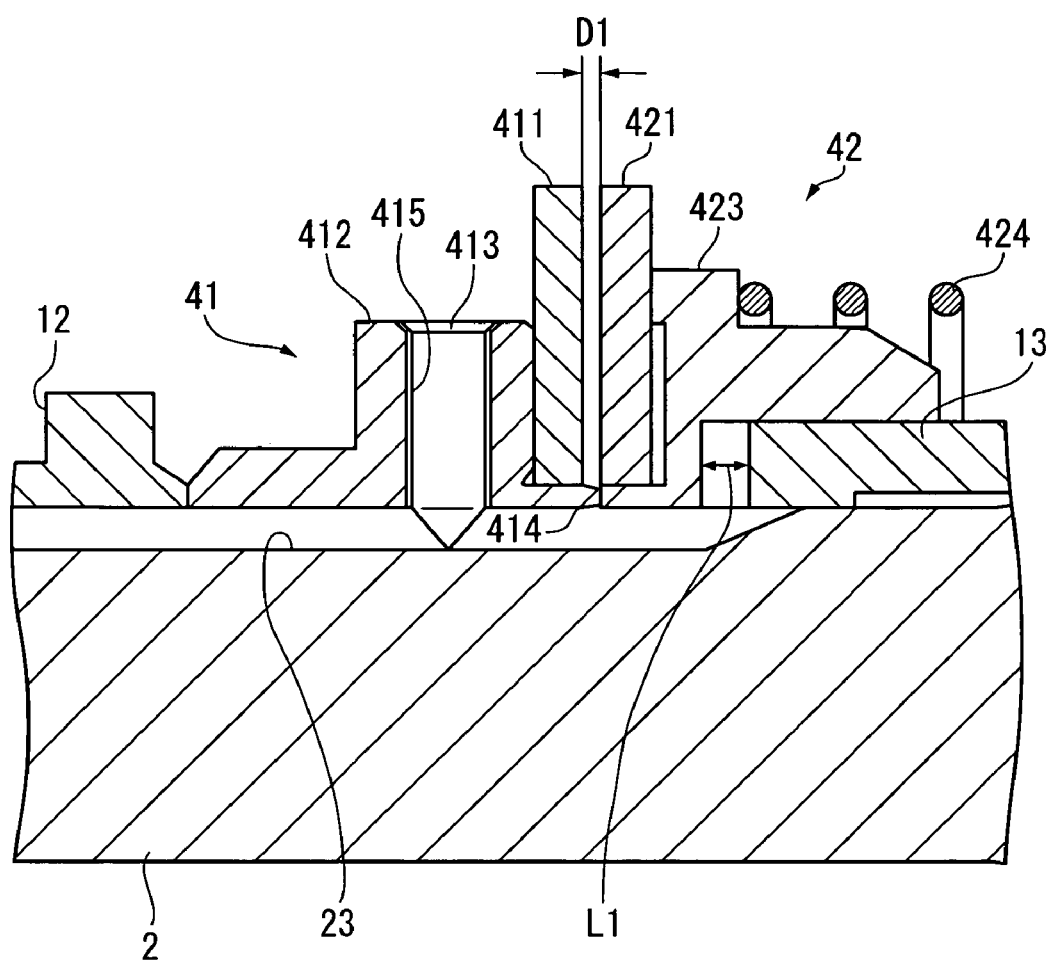
FIG. 3 is a cross-sectional view showing an encoder according to the embodiment.

FIG. 3 is a cross-sectional view showing the encoder 40. In FIG. 3, the rotor 41 includes a rotor base 412 provided outside the spindle 2 and a rotor 411 provided with a prespecified space from and at a position opposite to the stator 42 on this rotor base 412. The rotor base 412 and the rotor 411 may be integrated with each other, or may be formed with discrete members. Provided on the rotor base 412 is a pin through hole 415 facing toward an axial center of the spindle 2, and a rotor pin 413 is inserted and fixed in this pin through hole 415. In the spindle body 21 of this spindle 2, a linear V-shaped groove 23 having a V-type cross-section is provided along and in parallel to the longitudinal direction, and a tip of the rotor pin 413 is inserted into this V-shaped groove 23. With this configuration, the rotor pin 413 can slide against the spindle 2 and can deliver rotation of the spindle 2 to the rotor 41.

In the rotor 411, on a surface thereof opposite to the stator 42, coupling electrodes not shown are provided in a radial pattern against the center of the rotor 411. There is an insulating region between adjoining coupling electrodes.

An edge of the rotor 41 contacts an adjustment screw 12 which is an adjustment member provided at an edge section of the bearing tube 11 and capable of moving in the longitudinal direction of the spindle 2. The adjustment screw 12 has a substantially cylindrical form, and a male screw is provided on an external peripheral surface of an edge section thereof at a position closer to the bearing tube 11. A female screw is engraved on an internal peripheral surface of the bearing tube 11 at a position closer to the adjustment screw 12. The male screw of the adjustment screw 12 is engaged with the female screw of the bearing tube 11, and can move toward and away from the bearing tube 11 in association with rotation of the adjustment screw 12. Provided at the other edge of the rotor 41 is a rotation contacting portion 414 having a cylindrical form and slightly protruding along the external peripheral surface of the spindle 2, and the other edge of the rotor 41 contacts the stator 42 via this rotation contacting portion 414, and with this adjustment screw 12 and a portion of the stator 42 contacting the rotation contacting portion 414, the rotor 41 is positioned against the longitudinal direction of the spindle 2.

The stator 42 includes a stator board 421 provided with a prespecified space from and at a position opposite to the rotor 411 and a spring receiver 423 provided in the contrary side via the stator board 421 from the rotor 41.

FIG. 4 is a perspective view showing a mounting structure for the stator 42. In FIG. 4, the stator board 421 includes a stator circular portion 421A provided around the spindle 2 in a doughnut-like form and a stator longitudinal portion 421B extending from the stator circular portion 421A to inside of the frame body 10. An electrode section not shown is formed on a surface opposing the rotor 411 of the stator circular portion 421A. This electrode section includes transmission electrodes not shown and provided inside the stator circular portion 421A closer to the spindle 2 and receiving electrodes not shown and provided outside the stator circular portion 421A distance from the spindle 2. The transmission electrodes are provided with an equal space along the periphery, and the adjoining transmission electrodes are insulated from each other. The transmission electrodes and the receiving electrodes are provided with a prespecified space and insulated from each other.

A notch 422 is provided at a tip of the stator longitudinal portion 421B, and this notch 422 is hooked on the protrusion 53 provided inside the frame body 10 to fix the stator 42.

In this step, it is most desirable that the protrusion 53 is hooked in the notch 422 without any play and rattle and the stator 42 does not turn, but actually it is required to take into consideration the play and rattle generated due to circumstances during the production or that generated due to abrasion of the notch 422 or the protrusion 53 when used in specific situations. FIG. 7A and FIG. 7B show an range of errors generated in relation to a position of the notch 422 for hooking the stator 42. In FIG. 7A and FIG. 7B, it is assumed that the play and rattle of the notch 422 occurs within a width L2 and the protrusion 53 hooking in the notch 422 moves within this range. In a case where the notch 422 for hooking the stator 42 is provided at a position near the spindle 2 as shown in FIG. 7A, a rotation angle A1 of the stator 42 against the width L2 becomes larger. In contrast, in a case where the notch 422 is provided with a prespecified space from the spindle 2 as shown in FIG. 7B, the rotation angle A2 of the stator 42 becomes smaller as compared to the rotation angle A1. Because of this, to suppress an rotation error of the spindle 2 caused by play and rattle generated between the protrusion 53 and the notch 422, it is desirable to hook the stator 42 at a position away with a prespecified space from the spindle 2.

Again in FIG. 4, the spring receiver 423 is fixed on the external peripheral surface of the spindle 2 to the stator board 421. The spring receiver 423 may be integrated with the stator board 421, or may be formed as a discrete member. Provided in this spring receiver 423 is a spring 424 as an elastic member. An edge of this spring 424 contacts the spring receiver 423, and the other edge thereof contacts the inner sleeve 13 to bias the stator 42 toward the rotor. Further the spring receiver 423 contacts the rotation contacting portion 414 of the rotor 41 to position the stator 42.

Figure 5A:
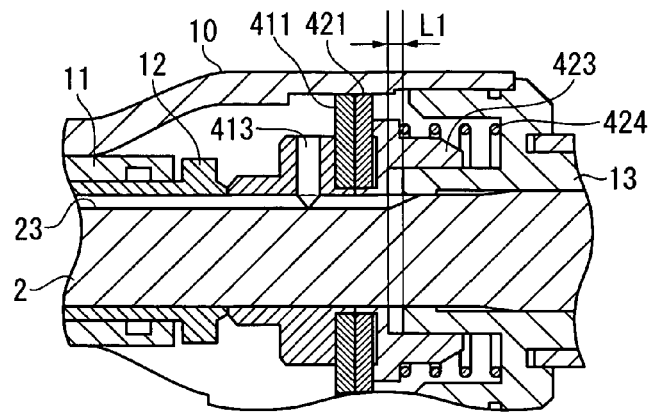
FIG. 5A is a cross-sectional view showing an encoder in the state where an adjustment member has been moved toward a supporting member.
Figure 5B:
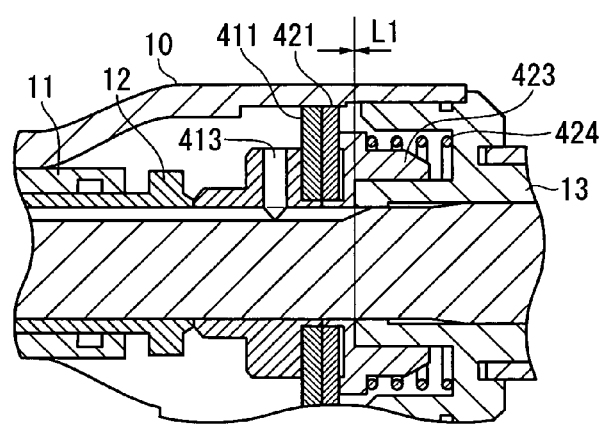
FIG. 5B is a cross-sectional view showing an encoder in the state where the adjustment member has been moved toward the rotor.
Figure 5C:
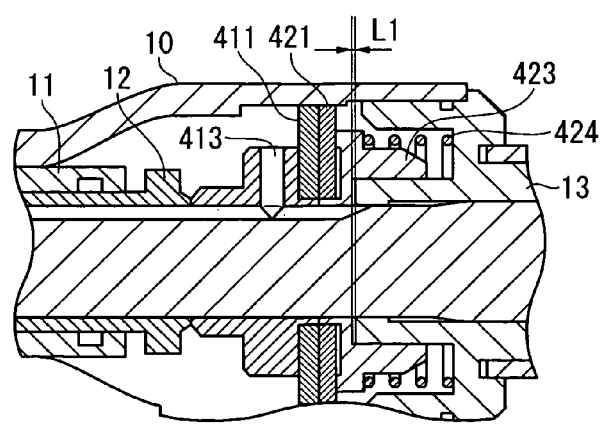
FIG. 5C is a cross-sectional view sowing an encoder in the state where the adjustment member has been moved to the optimal position.

Positioning of the encoder 40 as described above is carried out by adjusting the adjustment screw 12. FIG. 5A is a cross-sectional view showing the encoder 40 in the state where the adjustment screw 12 has been moved toward the bearing tube 11, FIG. 5B is a cross-sectional view showing the encoder 40 in the state where the adjustment screw 12 has been moved toward the rotor 41 to its limit, and FIG. 5C is a cross-sectional view showing the encoder 40 in the state where the adjustment screw 12 has been adjusted to an appropriate position.

When the adjustment screw 12 is moved toward the bearing tube 11 as shown in FIG. 5A, a clearance L1 between the inner sleeve 13 and the stator 42 becomes larger. In this state, if a strong impact or the like is loaded, the stator 42 displaces in this clearance L1, and a sensor gap D1, which is a clearance between the stator board 421 and the rotor 411, becomes larger, which may cause a measurement error or an error. When the adjustment screw 12 is moved toward the rotor 41 up to a position where the spring receiver 423 contacts the inner sleeve 13 as shown in FIG. 5B, the clearance L1 between the stator 42 and the inner sleeve 13 is eliminated. With this feature, the sensor gap D1 is kept constant, but as the rotor 41 is tightened by and between the adjustment screw 12 and the stator 42, so that the rotor 41 can not rotate smoothly, or can not rotate. Therefore, as shown in FIG. 5C, the adjustment screw 12 is set to a position slightly returned from the position where the stator 42 and the inner sleeve 13 contact each other, so that, even when a strong impact is loaded, the sensor gap D1 is kept constant and also the rotor 41 can rotate sufficiently.

In this encoder 40, when the spindle 2 displaces in the longitudinal direction, also the rotor 411 rotates in association with the displacement of the spindle 2. When an alternating current is previously loaded to the transmission electrode on the stator circular portion 421A, the coupling electrode formed in the rotor 411 electrostatically connects the plurality of transmission electrodes and the plurality of receiving electrodes formed in the stator circular portion 421A, so that the alternating currents with different phases respectively loaded to the transmission electrodes flow via the coupling electrode to the receiving electrodes. In this step, a phase in a waveform of an alternating current flowing to each of the receiving electrodes is compared to a phase in a waveform of the reference signal, and is converted to displacement in the axial direction of the spindle.

The electronic unit 50 includes a battery case 51 for accommodating a battery therein, a battery terminal 511, an interconnector 54 for connection of a display module enabling electric connection with the display module 60, a flexible board not shown and electrically connected to the stator 42 for delivering electric signals from the stator 42, a connector 56 for external output used when the micrometer 100 and other devices such as a personal computer are connected to each other, and all of the components are formed as a unit. Provided in this electronic unit 50 is the protrusion 53, and the notch 422 of the stator longitudinal portion 421B is hooked in this protrusion 53. With this configuration, the electronic unit 50 and the stator 42 are connected to each other, so that the stator 42 and the electronic unit 50 can easily be connected to each other electrically through the flexible board. The unitized electronic unit 50 is incorporated in the frame body 10, and is fixed to the frame body 10, for instance, by screwing.

The battery case 51 accommodates therein a compact and button type of battery such as a silver oxide battery, an air zinc battery, a mercury battery, an alkali button battery, or other types of batteries. Power is supplied from these batteries via the battery terminal 511 to the encoder 40, display module 60, or the like. The flexible board has a circuit printed on a synthetic resin board, and delivers electric signals sent from the encoder 40 to a controller not shown, and the electric signals processed by the controller are delivered via the interconnector for connection of a display module to the display module 60.

The display module 60 is fixed by screwing to the frame body 10 so that it covers the electronic unit 50. Connection with a connector or soldering is not required for electrically connecting this display module 60 to the electronic unit 50, and the display module 60 can electrically be connected to the electronic unit 50 by contacting it to the interconnector 54 for connection of a display module. Therefore, the display module 60 can completely be separated from the frame body 10 or the electronic unit 50.

Provided on an external surface of the display module 60 are a display 61 for digitally displaying measurement values, and operation buttons 62 for setting details for operation such as turning ON or OFF power or performing zero out. Provided on an inner surface of the display module 60 is a conductive contact portion not shown which contacts the interconnector 54 for connection of a display module.

A waterproofing mechanism of the micrometer 100 is described below. As shown in FIG. 2, O-rings 71 are respectively provided between an outer sleeve 3A provided inside the thimble 3 and the inner sleeve 13, and also between the outer sleeve 3A and the taper nut 14, and the O-rings 71 prevent droplets or the like from coming into the inside from the three-way notch 15. Further to prevent intrusion of droplets from a section between the bearing tube 11 and the spindle 2, a sealing member 72 is fit into a section where the bearing tube 11 and the spindle 2 contact each other.

Figure 6:
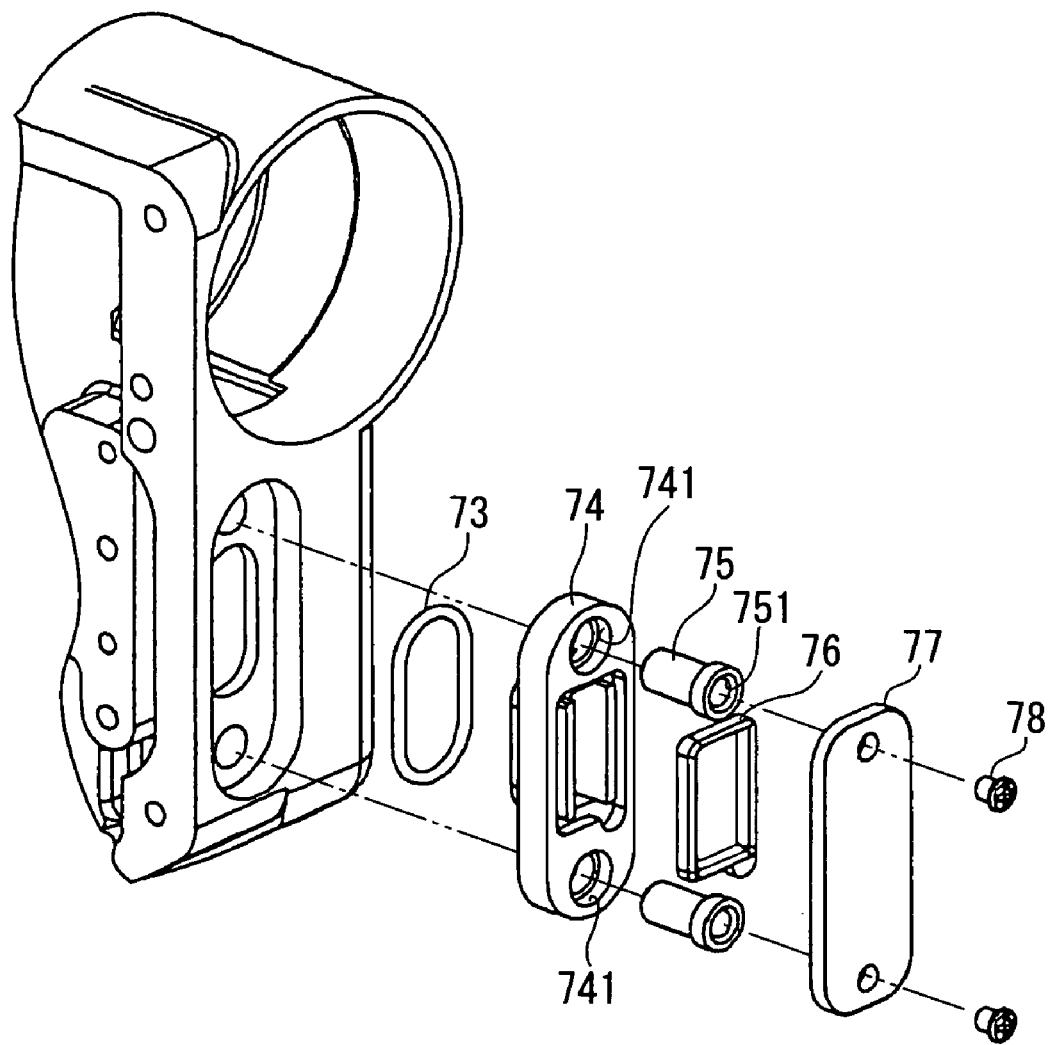
FIG. 6 is a perspective view showing one of waterproofing mechanisms according the embodiment.

FIG. 6 is a perspective view showing a waterproofing mechanism in the connector 56 for external output (Refer to FIG. 4). In this embodiment, the micrometer 100 has the connector 56 for external output to enable connection with external devices. When any external device is not used, it is necessary to provide a waterproofing mechanism around the connector 56 for external output.

In FIG. 6, a hole is provided in a section of the frame body 10 in which the connecter 56 for external output is provided. This hole has the same dimensions as those of the connector connecting portion of the connector 56 for external output. The connector 56 for external output is provided in this hole from inside of the frame body 10 to enable easy connection with external devices. Further a connector base 74 is attached thereto via a connector base seal 73 made from synthetic resin from outside of the frame body. The connector base 74 is attached thereto by press-fitting press screws 75 into screw holes 741 provided on both sides of the connector base 74. A cover 77 is attached thereto via the synthetic resin connector seal 76 from the outside of the connector base 74. Provided on a shaft of the press screw 75 is a taper hole 751, and the cover 77 is fixed by screwing a taper screw 78 into the taper hole 751 of the press screw 75, and in this state, the press screw 75 is further pressed to the screw hole 741 of the connector base, which further improves the waterproofing efficiency.

In the embodiment as described above, there are provided the following advantages:

(1) The stator 42 is hooked inside of the frame body 10 at a position with a prespecified space from the spindle 2, so that, different from the conventional technology, it is not required to fix the stator with a screw or screws, and the stator 42 can easily be mounted. Further it is not necessary to provide a screw hole on the frame body 10, so that the waterproofing work associated with a hole are not required.

Further the stator 42 is hooked in the protrusion 53 of the electronic unit 50 inside the frame body 10 away from the spindle 2 with a prespecified space, so that a rotation of the stator 42 along the periphery of the spindle due to play and rattle is small and a measurement error can be suppressed.

(2) As the rotor 41 is positioned with the adjustment screw 12 and the stator 42 is biased by the spring 424 toward the rotor 41 to contact the stator 42 to the rotation contacting portion of the rotor 41 for positioning, and therefore even if a strong impact such as that generated when dropped is loaded thereto, as the stator 42 is biased toward the rotor 41 by the spring 424, so that the stator 42 never displaces from the specified position. Because of the configuration, the sensor gap D1, which is a clearance between the stator board 421 and the rotor 411, is kept constant, so that the sensor gap D1 does not expand and measurement can be carried out without generating an error or a measurement error.

(3) The stator 42 is hooked in the protrusion 53 of the electronic unit 50, so that the stator 42 can be hooked at a position away from the spindle 2, and influence by play and rattle can be suppressed, and in addition, as the stator 42 and the electronic unit 50 are contacted to each other, electric connection between the stator 42 and the electronic unit 50 can be carried out quite easily.

(4) The display module 60 is electrically connected by contacting the interconnector 54 for connection of a display module of the electronic unit 50, so that wiring for electric connection is not required and a number of required components can be reduced. Further as it is not necessary to connect the display module 60 and the electronic unit 50 with a connector or by soldering, so that the display module 60 can be removed as a single body from the frame body 10, and the display module 60 does not cause any trouble during maintenance of the electronic unit 50, so that the maintenance work can be carried out smoothly.

(5) The electronic unit 50 is formed by unitizing the battery case 51, the battery terminal 511, the interconnector 54 for connection of a display module, and the connector 56 for external output with the flexible board, so that the assembly work can be carried out by incorporating the unitized electronic unit 50, and it is not necessary to incorporate each component discretely in the frame body 10. Therefore, the efficiency in assembly during the production process can largely be improved. Further, by incorporating a board enabling conduction between components in this unit, the need for wiring work is eliminated, and a number of required components can be reduced.

It is to be noted that the digital displacement measuring instrument according to the present invention is not limited to the embodiment described above, and it is needless to say that various changes are allowable within a range not departing from the purpose of the present invention.

For instance, an electrostatic capacitance encoder is used as the encoder 40 in the embodiment described above, but the present invention is not limited to this configuration. Namely the encoder may be an optical one or an electromagnetic one, and any type of digital encoder may be used so long as a relative rotation rate between the stator 42 and the rotor 41 can be detected.

Further the micrometer 100 is described as an example of the digital displacement measuring instrument in the embodiment described above, but the present invention is not limited to this case. For instance, such a device as a slide gauge may be used for this purpose on the condition that the device can be provided in the frame body 10 in the state where the spindle 2 can freely be slid and the encoder 40 for detecting a sliding rate of the spindle 2 is provided inside the frame body 10.

In the embodiment described above, only one rotor pin 413 is provided in the rotor base 412 and one V-shaped groove 23 is provided in the spindle 2, but the present invention is not limited to this configuration. For instance, the configuration is allowable in which a plurality of rotor pins 413 are provided in the rotor base 412 and also a plurality of V-shaped grooves 23 parallel to each other are provided. In this case, the plurality of rotor pins 413 slidably contact the spindle 2, so that a relative position of the rotor 41 against the spindle 2 can accurately be decided with no play and rattle generated between the spindle 2 and the rotor 41.

Although the connector 56 for external output is provided in the electronic unit 50 in the embodiment described above, the configuration is allowable in which the connector 56 for external output is not used, and in this case, a waterproofing mechanism is not required in a section where the connector 56 for external output is installed.

Although a button type of battery is used as a battery in the embodiment described above, the present invention is not limited to this configuration. For instance, an alkali battery may be used if a sufficient space for accommodating the alkali battery is available. In this case, however, the size of the stator becomes larger according to the size of the battery. To reduce the size of the entire instrument, it is preferable to use a button type of battery. Further, when a manganese dry cell or an alkali dry cell is used, a voltage of the cell will gradually drop from the start of its use, but a silver oxide battery can generate a stable voltage and can preserve the original voltage up to a point of time just before the life comes to the end, so that the battery can be utilized efficiently and effectively.

In the embodiment described above, a waterproofing mechanism is provided around the connector 56 for external output as well as around the spindle, but the waterproofing mechanism for the micrometer 100 is not limited to the configuration described above. For instance, the configuration is allowable in which the waterproofing mechanism is provided between the frame body 10 and the inner sleeve 13, in a section where the display module 60 is mounted, or at any position where the possibility of intrusion of water droplets is suspected.

What is claimed is:

1. A digital displacement measuring instrument comprising:
   a main body;
   a spindle slidably provided at the main body;
   an encoder accommodated in the main body for detecting displacement of the spindle to convert a value for the detected displacement to an electric signal, the encoder having a rotor rotating in a peripheral direction of the spindle and a stator provided inside the main body at a position opposite to the rotor with a prespecified space therefrom;
   a support member provided at an edge of the main body for supporting the spindle in the longitudinal direction thereof;
   an adjustment member provided on the support member for positioning the rotor; and
   an elastic member for biasing the stator toward the rotor,
   wherein the stator is directly or indirectly via other component hooked in the main body at a position away with a prespecified space from the spindle.

2. A digital displacement measuring instrument comprising:
   a main body;
   a spindle slidably provided at the main body; and
   an encoder accommodated in the main body for detecting displacement of the spindle to convert a value for the detected displacement to an electric signal,
   wherein the encoder has a rotor rotating in a peripheral direction of the spindle and a stator provided inside the main body at a position opposite to the rotor with a prespecified space therefrom,
   wherein the stator is directly or indirectly via other component hooked in the main body at a position away with a prespecified space from the spindle,
   wherein an electronic unit for supplying power to the encoder and enabling delivery of electric signals from the encoder is provided within the main body, and
   wherein the electronic unit has a protrusion with the stator hooked in this protrusion.

3. The digital displacement measuring instrument according to claim 2,
   wherein a display module for displaying the electric signal converted by the encoder and sent to the electronic unit as a measurement value is provided at the main body, and
   wherein the display module covers and also contacts the electronic unit to be connected thereto electrically.

4. The digital displacement measuring instrument according to claim 3, wherein the electronic unit is formed by unitizing a battery case for accommodating a battery therein, a battery terminal, an interconnector for enabling electric conduction by contacting the display module, and a stator wiring member for electrically connecting the stator to the electronic unit.

* * * * *